C. A. LA COUR.
CLAMPING DEVICE FOR DEMOUNTABLE RIMS.
APPLICATION FILED AUG. 27, 1920.

1,425,025.

Patented Aug. 8, 1922.

WITNESSES

INVENTOR
C. A. la Cour
H. J. Sanders
ATTORNEY

UNITED STATES PATENT OFFICE.

CARL AUGUST LA COUR, OF WASHINGTON, NEBRASKA.

CLAMPING DEVICE FOR DEMOUNTABLE RIMS.

1,425,025.  Specification of Letters Patent.  Patented Aug. 8, 1922.

Application filed August 27, 1920. Serial No. 406,411.

*To all whom it may concern:*

Be it known that I, CARL AUGUST LA COUR, a citizen of Denmark, residing at Washington, in the county of Washington and State of Nebraska, have invented certain new and useful Improvements in Clamping Devices for Demountable Rims, of which the following is a specification.

This invention relates to improvements in clamping devices for demountable rims and its object is to provide a simple practical device of this class that is very easily applied or removed, that is efficient in use, durable, and cheap to manufacture. With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts throughout the several views.

Figures 1, 2, 3:
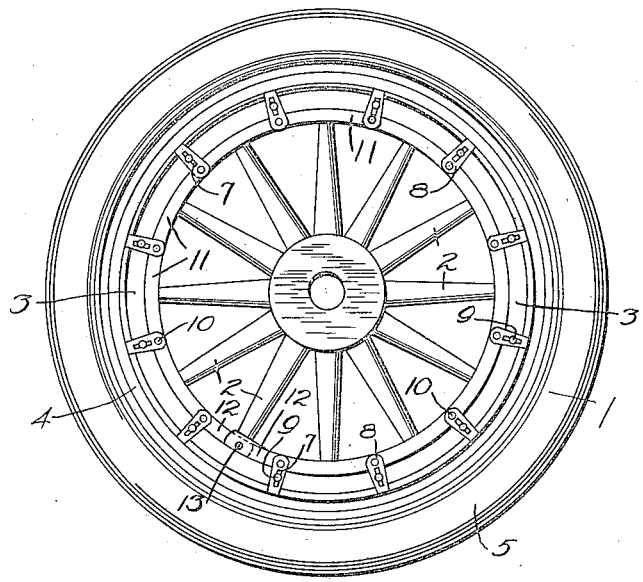
Fig. 1 is a view of a vehicle wheel provided with my improved device.
Fig. 2 is an enlarged fragmentary sectional view through Fig. 1 clearly illustrating the application of my device.
Fig. 3 is a fragmentary view of the clamping device with the wedge ring eliminated.

The reference numeral 1 denotes a wheel in its entirety provided with my device, the wheel comprising the spokes 2, felly 3, demountable rim 4 and tire 5. The felly is formed with a plurality of perforations to receive the screw bolts 6 which extend transversely therethrough and through the elongated slots 7 in the links 8, the heads 9 of said screw bolts being adapted for engagement with the said links 8 to retain them in assembled position. Pivotally connected to the links 8 by the pins 10 is a flat sectional ring the component sections 11 of which are connected by the two relatively short overlapping sections 12 which are connected together pivotally by the pin 13, said flat ring in operative position being disposed between the felly 3 and the several links 8. One edge of the felly 3 is beveled to receive a wedge ring 14, triangular in cross section, and disposed between the links 8 and said felly and the demountable rim 4, said wedge ring being upon the opposite side of the bolts 6 with relation to the flat ring aforesaid. As the bolts 6 are tightened upon the links 8 by the bolt nuts the wedge ring 14 is forced against the felly and demountable rim 4 securely retaining the latter in position.

In applying my clamping device the wedge ring is first applied to the felly and demountable rim and manually held in position, the flat ring and links are then applied and said members are then held in position by tightening the bolts 6. Loosening said bolts 6 will release the links 8 and permit them to be individually moved upon the pins 10 out of engagement with the wedge ring when the same can be removed and the demountable rim taken off. Preliminary to loosening the bolts 6 the short sections 12 may be forced, by blows from a hammer or otherwise, into the position shown dotted in Fig. 3 thus collapsing or permitting the flat ring to be collapsed. Each pin 10 adjacent the overlapped ends of the short sections 12 carries one end of one of said sections and also one end of one of the sections 11.

What is claimed is:—

In clamping devices for the demountable rims of vehicle wheels, a flat sectional ring, two of the sections of said ring being smaller than any of the remaining ring sections, said two sections being pivotally connected to the adjacent ring sections and to each other, longitudinally slotted links pivotally connected to the sections of said ring, a wedge ring disposed between said links and the demountable rim, and screw bolts extending through the wheel felly and through the longitudinal slots in said links whereby the same may be forced against said wedge ring and flat sectional ring.

In testimony that I claim the foregoing as my own I have hereto affixed my signature in the presence of two subscribing witnesses.

CARL AUGUST LA COUR.

Witnesses:
RAS C. RASMUSSEN,
GEO. T. HEDELUND.